No. 770,793. PATENTED SEPT. 27, 1904.
D. T. BLEVINS, R. L. & W. R. BENTON & E. I. RAYMOND.
BEET TOPPER.
APPLICATION FILED OCT. 3, 1903.
NO MODEL. 2 SHEETS—SHEET 1.
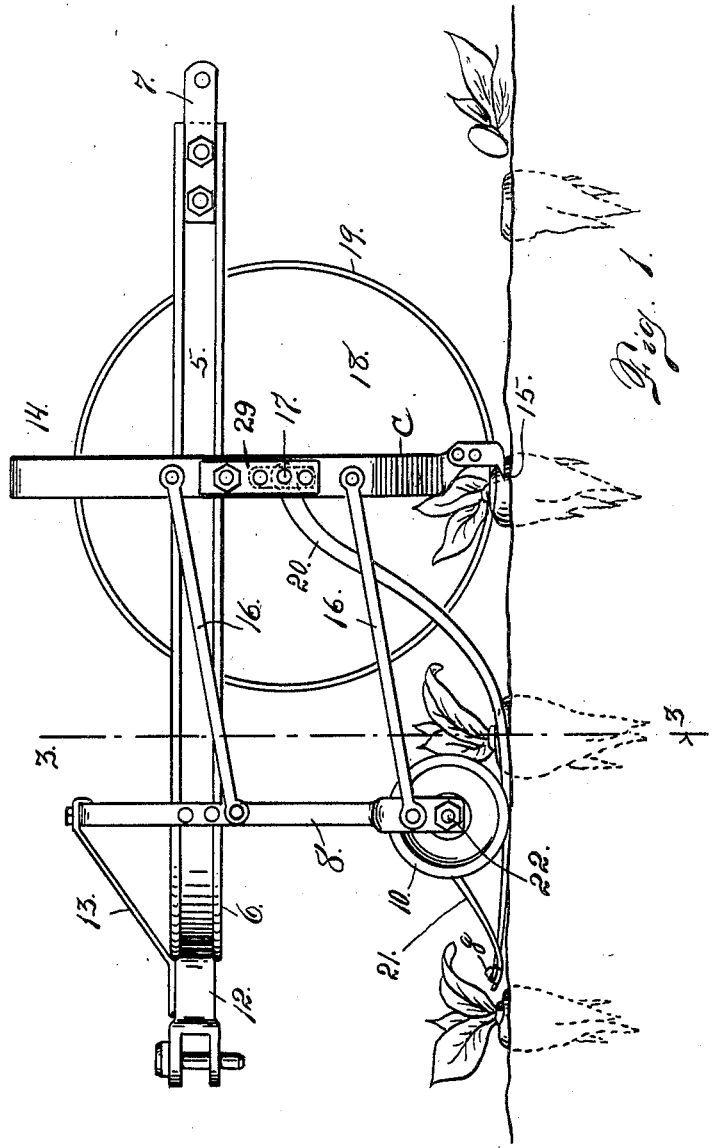

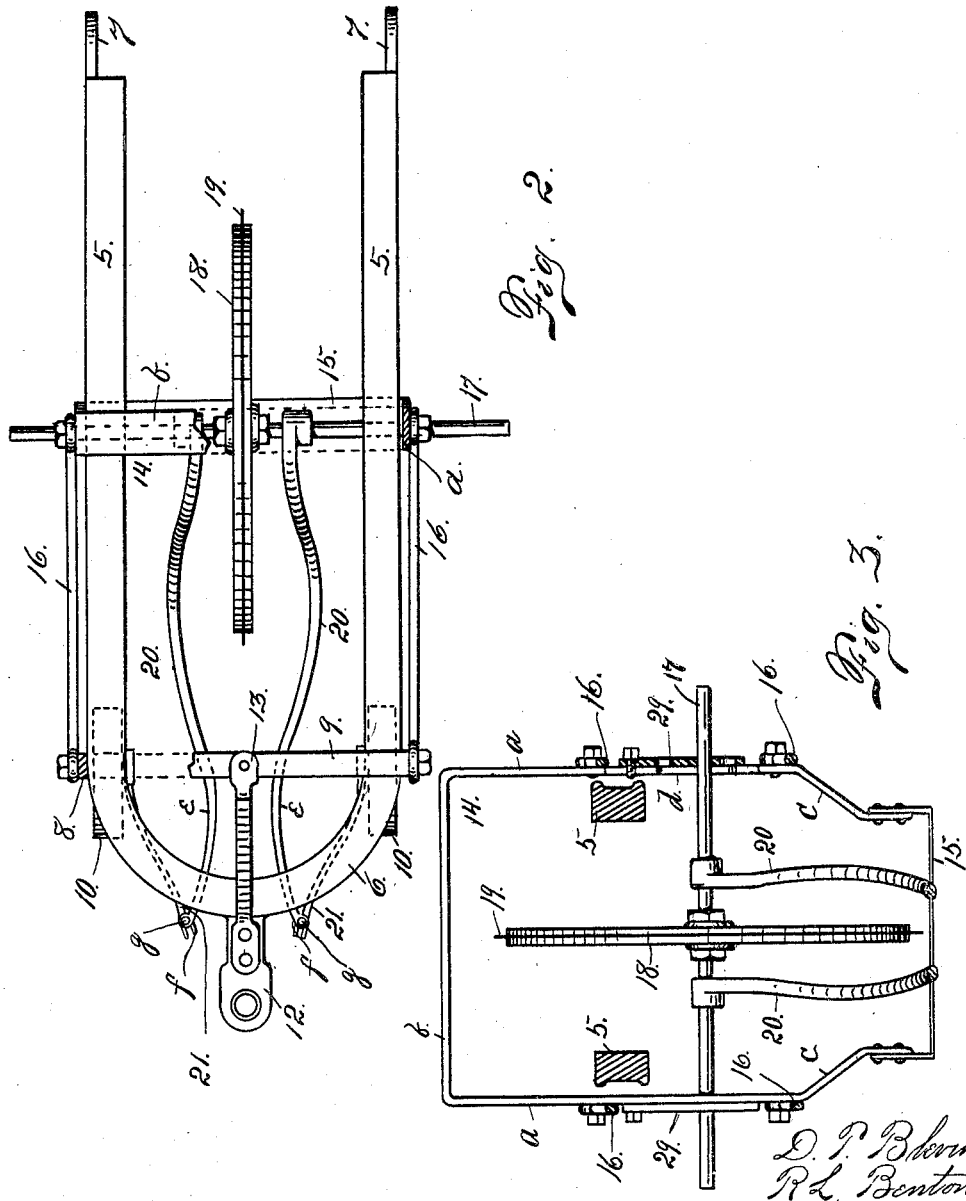

No. 770,793. Patented September 27, 1904.

UNITED STATES PATENT OFFICE.

DAVID T. BLEVINS, ROY L. BENTON, WILLIAM R. BENTON, AND EDGAR I. RAYMOND, OF WINDSOR, COLORADO.

BEET-TOPPER.

SPECIFICATION forming part of Letters Patent No. 770,793, dated September 27, 1904.

Application filed October 3, 1903. Serial No. 175,609. (No model.)

*To all whom it may concern:*

Be it known that we, DAVID T. BLEVINS, ROY L. BENTON, WILLIAM R. BENTON, and EDGAR I. RAYMOND, all citizens of the United States of America, residing at Windsor, in the county of Weld and State of Colorado, have invented certain new and useful Improvements in Beet-Toppers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in vegetable-toppers, and while more especially intended for use in the topping of beets it will be understood that it may be employed in topping all vegetables of like character.

Our improved device is adapted for use in connection with a digger or means for uprooting the vegetables, which is located in the rear of the topper and connected therewith. The digging or uprooting means is not shown in the drawings, as nothing is claimed thereon in this application.

Our object is to provide an apparatus of this class which while adapted to efficiently perform the vegetable-topping function shall be simple in construction, economical in cost, and which requires no special skill for its successful operation.

The invention will now be described in detail, reference being made to the accompanying drawings, in which is illustrated an embodiment thereof.

In the drawings, Figure 1 is a side elevation of our improved vegetable-topper. Fig. 2 is a top or plan view of the same. Fig. 3 is a vertical section taken on the line 3 3, Fig. 1.

The same reference characters indicate the same parts in all the views.

Let the numeral 5 designate each of two parallel frame-bars connected in front by a curved part 6. The rear extremities of the frame-bars 5 are provided with parts 7, adapted to be connected with a digger. (Not shown.) The frame is supported in front by a yoke composed of upright parts 8 and a top part 9, formed integral with the two parts 8. Suitably connected with the lower extremity of each part 8 is a wheel 10, which engages the ground on each side of the row of beets. (See Fig. 2.) The front end of the frame is provided with a forward extension 12, to which the team for hauling the apparatus may be attached. This part 12 is connected with the top part 9 of the yoke by a brace 13.

In the rear of the yoke 8 is a larger yoke 14, composed of vertical parts *a a*, a top part *b*, connecting the parts *a*, and inwardly-inclined lower extremities *c*, to which is attached the knife or cutter 15. The yoke 14 is connected with the forward yoke by two pairs of parallel links 16, one pair being located on each side of the machine. The yoke 14 is not directly connected with the frame-bars 5 and is vertically movable independently of the said bars. The bars *a* of the yoke 14 are each provided with a vertical slot *d*, through which passes a shaft 17, upon which the gage-wheel 18 is mounted and made fast. The shaft 17 is journaled in plates 29, which are vertically adjustable on the parts *a* of the yoke 14 for the purpose of regulating the position of the gage-wheel 18. This gage-wheel is provided on its periphery with a narrow blade 19, which extends entirely around the wheel and which enters the neck of the beet or other vegetable as far as it is permitted by the face of the wheel and determines the vertical position of the knife 15, which is located immediately below the blade 19. The position of this wheel is so regulated with reference to the topping-knife that the latter is maintained in a proper horizontal plane for the performance of its function. The shaft 17 is movable endwise in the adjustable plates 29 in order to allow the gage-wheel to shift its position and properly engage beets that are out of alinement in the row. This shifting function is accomplished through the instrumentality of arms which are secured to the shaft 17 on opposite sides of the wheel 18. From the shaft 17 the arms are curved downwardly to the ground and extend forwardly from the gage-wheel on opposite sides of the beet-row. The space between the arms or feelers 20 is such as to take in all beets that are out of the row alinement. The forward portions of the feelers are curved outwardly from the points *e*, where the space between them is narrowest. When a beet is out of the row alinement on either side, it is engaged by the forward portion of one of these feelers, and as the machine moves along a distance equal to the distance between the points *f* and *e* the pressure of the beet against the arm will shift the latter, together with the shaft 17 and the gage-wheel 18, to bring the latter into alinement with the said beet. Hence the gage-wheel becomes operative as to all beets whether in or out of alinement in the row. The forward extremities of the feelers 20 are pivotally connected with short spring-arms 21, whose rear extremities are attached to the journals 22 of the track-wheels 10.

When the topper is in use, the parts 7 are connected with a digger, (not shown,) as heretofore explained, and as the team hitched to the front extension 12 draws the machine over the field the topping function is accomplished while the beets are in the ground and before they are uprooted by the digging mechanism located in the rear. During the operation of the machine the gage-wheel 18, together with its shaft, is shifted from side to side to bring it into alinement with beets that are somewhat out of alinement in the row. This shifting function is accomplished by virtue of the engagement of the feeler-arms 20 with the beets, whereby sufficient side pressure is applied to the feeler-arms to perform the gage-wheel-shifting function. This gage-wheel, as heretofore explained, enters the top part of the beet to the depth of its narrow blade 19, and thus determines the horizontal plane in which the topping-knife 15 moves. The gage-wheel may be regulated by the vertical adjustment of the plates 29 and its position with reference to the knife 15 determined at pleasure.

Attention is called to the fact that the forward extremities of the spring-arms 21 are bifurcated to receive pins *g*, fast in the forward extremities of the feeler-arms. These bifurcated extremities permit the necessary play during the shifting operation. It is evident that the spring-arms, which normally occupy the position shown in Fig. 2, have a tendency to maintain the feeler-arms and gage-wheel normally in the position shown in the drawings. Hence immediately after the side pressure exerted by a beet out of the row alinement ceases to act the spring-arms 21 will return the parts to their normal position.

Having thus described our invention, what we claim is—

1. In a vegetable-topper, the combination with a frame, of a yoke vertically movable on said frame, a gage-wheel journaled in said yoke and provided with a blade projecting from its peripheral face and adapted to enter the top of the vegetable during the topping operation, and a topping-knife mounted on the lower part of the yoke and occupying a predetermined position with reference to the gage-wheel.

2. In a vegetable-topper, the combination with a frame mounted to be drawn along over the surface of the ground, of a vertically-movable device connected with said frame and having a topping-knife at its lower extremity, and a gage-wheel journaled in said vertically-movable device and having a blade projecting from its peripheral face and adapted to enter the vegetable during the topping operation, and means for regulating the relative position of the gage-wheel and the topping-knife.

3. The combination with a frame, of a yoke rigidly connected with the frame and having wheels at its lower extremities and adapted to engage the surface on opposite sides of the row of vegetables to be topped, a second yoke connected with the first-named yoke by links whereby the second yoke is vertically movable, a topping-knife mounted on the lower part of the second yoke, and a gage-wheel also mounted on the second yoke and occupying a proper relative position with reference to the topping-knife.

4. In a vegetable-topper, the combination with a framework, of a topping-knife mounted on the lower part of said framework, a gage-wheel mounted on the framework and laterally movable to come in contact with vegetables which are out of the row alinement, and feeler-arms connected with the gage-wheel and projecting forwardly therefrom on opposite sides of the row of beets, the said feeler-arms being rigidly connected with the gage-wheel, whereby as either arm engages a vegetable out of alinement with the row, the gage-wheel is shifted toward the side of the row where the unalined vegetable is located, whereby the gage-wheel is brought into proper relative position to perform its function.

5. The combination with a relatively stationary frame, of a vertically-movable frame mounted thereon, a shaft journaled in the vertically-movable frame and endwise movable in said frame, a gage-wheel made fast to the said shaft, and means also connected with the shaft for shifting the gage-wheel into proper alinement with vegetables out of alinement with the row and which would normally occupy a position out of alinement with the gage-wheel.

6. The combination with a relatively stationary frame composed of two parallel side bars connected by a front curved portion, a forward yoke rigidly connected with the said frame, wheels journaled in the arms of the forward yoke and adapted to engage the ground on opposite sides of the row of vegetables, a second yoke located in the rear of the first-named yoke, links connecting the two yokes whereby the rear yoke is vertically movable with reference to the stationary frame, a gage-wheel mounted on the second yoke and vertically adjustable thereon, and a topping-knife mounted on the lower part of the second yoke and normally occupying a predetermined position with reference to the gage-wheel.

7. The combination with a relatively stationary frame, of a vertically-movable frame mounted thereon, a shaft journaled in the vertically-movable frame and endwise movable in said frame, a gage-wheel made fast to said shaft, and means connected with the shaft for shifting the gage-wheel into proper alinement with a vegetable out of alinement in the row, and also for returning the gage-wheel and its connections to their normal position after passing the vegetable out of alinement.

In testimony whereof we affix our signatures in presence of two witnesses.

DAVID T. BLEVINS.
ROY L. BENTON.
WILLIAM R. BENTON.
EDGAR I. RAYMOND.

Witnesses:
   JOSEPH H. COPE,
   JNO. L. BURTIS.